UNITED STATES PATENT OFFICE.

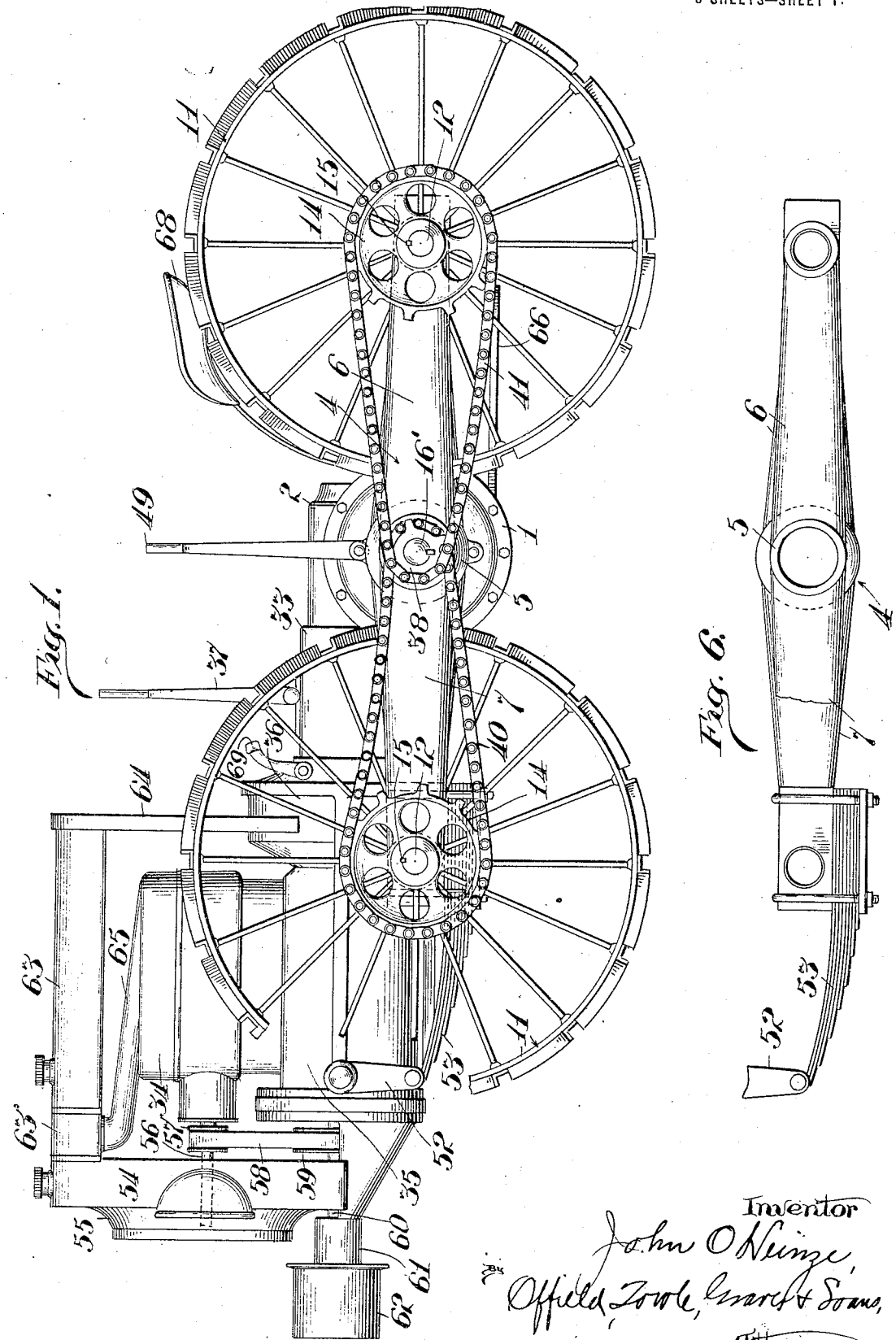

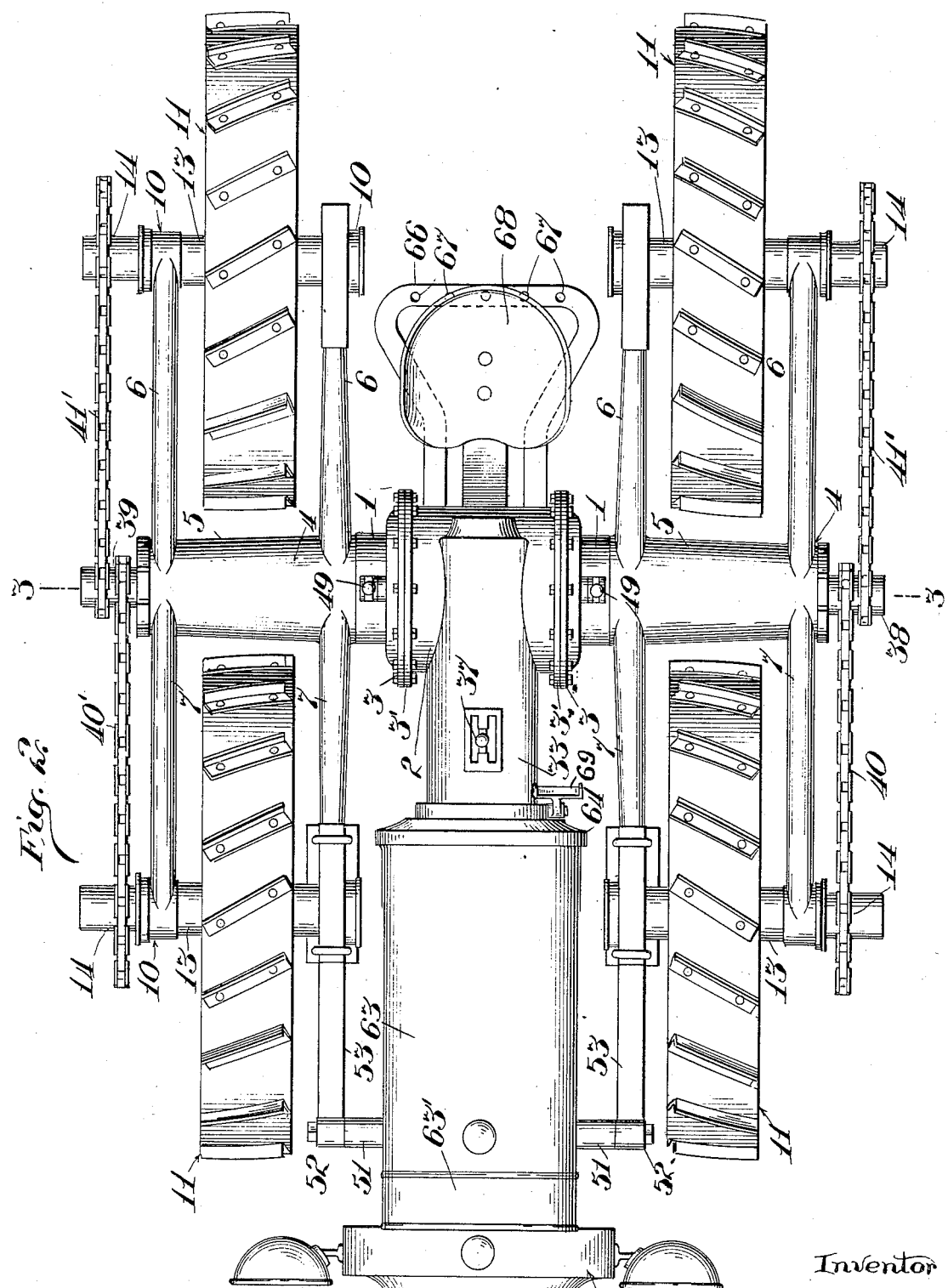

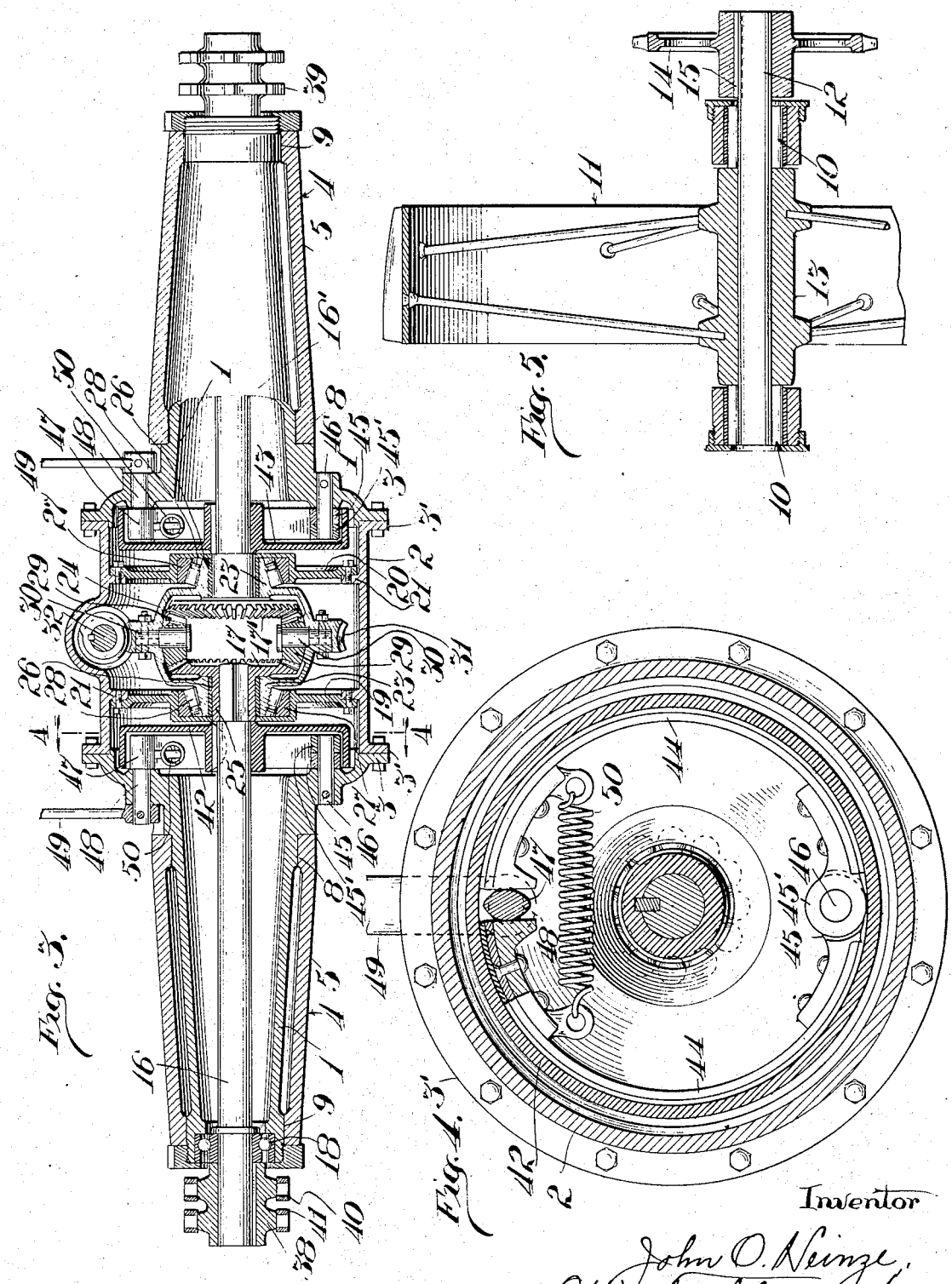

JOHN O. HEINZE, OF BOYNE CITY, MICHIGAN.

TRACTOR.

1,318,557. Specification of Letters Patent. Patented Oct. 14, 1919.

Application filed September 23, 1918. Serial No. 255,261.

*To all whom it may concern:*

Be it known that I, JOHN O. HEINZE, a citizen of the United States, residing at Boyne City, in the county of Charlevoix and State of Michigan, have invented certain new and useful Improvements in Tractors, of which the following is a specification.

This invention relates to new and useful improvements in tractors, of the general type commonly employed for drawing agricultural implements, and the like.

Among the salient objects of the invention are to provide a machine which may be operated as a four wheel drive, or as a two wheel drive, at will; to provide a machine which is so organized that the driving connections between the tractor wheels and the main shaft remain undisturbed by pitching and rocking movements of the machine; to provide a machine in which all of the transmission power is transmitted from the engine to a single, transversely disposed differential shaft located midway between the front and rear tractor wheels, and all of the power transmitted to the tractor wheels is derived directly from the respective ends of said main differential shaft; to provide a construction in which each lateral pair of wheels is mounted in a rigid yoke whose axis of oscillation is concentric with the main differential shaft; to provide a machine in which the power plant, comprising engine frame, engine carried thereby, transmission mechanism and its housing, are carried and supported by three point suspension, one end of the said power plant being carried by a transverse housing arranged concentric with the main differential shaft, and the other end thereof being spring supported from the main wheel yokes; to provide a machine in which the steering is affected by frictionally retarding either half of the two-part main differential shaft; to provide a machine so organized that oscillatory movement of either tractor wheel yoke relatively to the other can not and will not disturb the complete freedom of movement of the power producing and transmitting mechanism; to provide improvements in the construction and arrangement of the water-cooling system which serves the engine; to provide a machine characterized by great simplicity and fewness of parts; to provide a machine which can be both assembled and taken apart, as to its main features of construction, with the greatest convenience; to provide a construction so organized that the main differential gearing is mounted and supported in a simple and reliable manner while at the same time a closed casing is provided which enables the differential gears to be run submerged, or partly submerged, in oil; and in general, to provide a simple and improved tractor of the general character described.

The invention consists of the matters hereinafter described and more particularly pointed out in the appended claims.

In the drawings:

Figure 1 is a view showing the tractor in side elevation, with certain parts broken away to expose to view other parts.

Fig. 2 is a plan view of the machine.

Fig. 3 is a view, chiefly in vertical section, in a plane coincident with the axis of the main differential shaft.

Fig. 4 is a cross-sectional detail on line 4—4 of Fig. 3, and looking in the direction of the arrows.

Fig. 5 is a sectional detail of one of the tractor wheels and its journal supports.

Fig. 6 is a side elevation of one of the wheel yokes detached from the machine, one of the forward arms of the yoke being broken away to disclose the mounting of the engine supporting spring upon the other yoke arm.

Referring to the drawings, 1—1 designate a pair of axially alined transversely disposed tubular housing frames, which, together with a generally cylindrical intermediate housing member 2, constitute the main transverse frame member of the machine. The housings 1—1, as seen clearly in Figs. 1 and 3, are rigidly bolted to the respective ends of the housing member 2; the adjoining parts being provided with peripheral flanges 3, 3', for this purpose. In the preferred form shown, each housing member 1, is outwardly tapered, and its exterior constitutes a journal bearing, upon which is mounted to oscillate, a corresponding wheel yoke 4. Each wheel yoke comprises a central main body, member 5, constituting its journal part, and oppositely disposed pairs of yoke arms 6, 6 and 7, 7. The interiors of the journal parts 5, are cored out so as to bear upon the housing frame 1, at their ends only as indicated at 8 and 9—Fig. 3.

The end of each yoke arm terminates in a bearing, within which is mounted a roller bearing designated as a whole by 10; the bearings of each pair of yoke arms being, of course, alined. Each tractor wheel 11, is provided with a spindle 12, cast, or otherwise made rigid with the hub 13, of the wheel, and the ends of which spindle take into the respective roller bearings 10. The outer end of each spindle 12, of each tractor wheel, is provided with a sprocket wheel 14, keyed or otherwise made rigid with the spindle, as indicated at 15.

Describing now the differential shaft and its associated mechanism, as will be seen by reference to Fig. 3, this shaft is, as usual, composed of two alined sections 16, 16', each of which carries at its inner end the usual differential bevel gear, as 17, 17'. The outer ends of the differential shaft sections are carried in roller bearings 18, mounted in the ends of the tubular housing frame members 1, as best seen at the left hand end of Fig. 3. To support the inner ends of these shaft sections and associated gear mechanism, diaphragm plates 19, 20, are provided within the central housing member 2; the latter being for this purpose provided with internal flanges 21, to which the peripheries of the plates 20 are bolted, as clearly shown. Plates 19, 20 are centrally apertured to receive the hub-like extension 23, of one side of the differential annulus 24, and to receive the hub part 25, of the opposite differential gear 17. Each diaphragm plate 19, 20 is recessed or provided with an internal annular rabbet 26, in which rabbets are seated bearing rings 27. Annular sets of roller bearings 28 are interposed between the bearing rings 27, and the hub-like extensions of the differential annulus 24.

The annulus 24 carries upon its interior a plurality of differential bevels 29, journaled upon radially disposed bearing pins 30. The outer periphery of the annulus 24 is in the present construction a worm gear 31, which is engaged and driven by a worm shaft 32. This shaft 32 extends horizontally forward into, and forms a part of, the change speed mechanism, which is of any usual or suitable construction, is contained in the change speed mechanism box 33, and need not be specifically described.

It will be understood that the gas engine 34, seen in side elevation in Fig. 1, may be of any usual or preferred construction, its specific character forming no part of the present invention; that the crank shaft of the engine is located as usual in the crank housing 35, immediately below the engine; and that the crank shaft, provided with its usual fly-wheel contained in the housing 36, is connected by any usual clutch mechanism with the change speed mechanism arranged within the housing 33 hereinbefore referred to; the change speed mechanism being controlled by the usual change or speed shift lever 37. The engine and train of mechanism described serve to actuate the differential shaft sections in the usual way.

In order to drive the tractor wheels from the respective differential shaft sections, each said shaft section has keyed upon its end, a double-shrouded sprocket, designated 38 and 39 respectively. Sprocket or chain belts 40, 41 connect the sprocket 38 with the front and rear tractor wheels at that side, while the sprocket 39 is similarly connected to the front and rear tractor wheels at the opposite side by chain belts 40' and 41'. It will, of course, be obvious that the driving, or gear, ratio between the differential shaft and the several tractor wheels may be changed by varying the relative sizes of the sprockets upon these parts; such variation in speed or driving ratio being possible independently of the change speed mechanism.

In order to steer the tractor in a simple and effective way, I have provided friction brake mechanism whereby either differential shaft section may be retarded at will. Referring particularly to Figs. 3 and 4, 42 and 43 respectively designate internal brake drums keyed upon the respective differential shaft sections 16 and 16'. The brakes are alike except that they are reversely disposed and one only will be described. Inside the brake drum 42, are arranged two semi-circular brake ring members as 44, 44', each provided with a hinge knuckle 45, 45' which are fitted upon, and engage an anchor pin 46, properly seated in the lower part of the corresponding tubular housing member 1, as best seen in the lower part of Fig. 3. The free ends of the half rings 44, 44' approach each other but are spaced apart sufficiently to receive the end 47, of a rocking brake rod 48. Brake rod 48 is journaled in the upper part of the housing member 1, as shown clearly in Fig. 3, and that part of the rod which extends between the ends of the expanding half-rings is oval in cross section, as shown clearly in Fig. 4. A brake handle 49, is keyed upon the outer end of rod 48, so that the latter may be oscillated to expand the half rings. These half rings are shod upon their outer surfaces with raybestos or other friction material, as usual. The half-rings are drawn together to relieve the braking action by a coiled contractile spring 50, as shown clearly in Fig. 4.

It will be obvious that operating the brake lever 49 at either side of the machine will retard or completely arrest the rotation of the differential shaft at that side, whereupon the other differential shaft section will speed up and accelerate the speed of the tractor wheels at that side causing the latter to travel around the retarded side of the machine. This method of steering has been found very effective in practice.

The three point suspension of the engine upon the tractor frame has been mentioned. To this end the engine frame, or more specifically, the lower part of the engine frame is provided at each side with trunnion-like extensions 51, which carry depending links 52, the lower ends of which are connected to the front ends of quarter-elliptic springs 53. The springs 53, are at their opposite ends shackled to the under sides of the corresponding yoke arms 7, as best seen in detail Fig. 6.

54 designates as a whole, the radiator, mounted upon the front end of the engine frame in substantially the usual manner. In the present instance, however, the radiator fan (not shown) is inclosed in a housing 55, at the front side of the radiator; the fan being driven by a shaft 56, supported at the front side of the engine and extending through a suitable aperture in the middle of the radiator. The fan shaft is provided with a pulley 57, driven by means of a belt 58, from another pulley 59, mounted upon an extension of the crank shaft 60. Said crank shaft is extended out in front of the radiator and carries a pair of jack pulleys 61 and 62.

In order to provide additional water capacity for the radiator and also a tank for gasolene or other fuel supply, a tank 63, is mounted to overlie the engine, the front end of this tank being connected to and communicating with the upper water space of the radiator 54, while the rear end of the tank is supported by a bracket 64, rising from the top of the flywheel casing 36. Tank 63 is divided internally by a transverse partition as indicated in dotted lines at 63′; the rear part of the tank being a reservoir for gasolene or other fuel. The upleading or return trunk 65, extends from the engine casing obliquely upwardly, and forwardly to that part of the tank 63 which communicates with the radiator, as shown clearly in drawings.

The transmission mechanism includes the usual friction drive-and-disconnect clutch, controlled by pedal lever 69.

The tractor frame is provided with a stirrup-shaped draft bar 66, shown clearly in plan Fig. 2, the arms of which are bolted to, or otherwise made rigid with, the lower side of the main frame of the machine. This draft bar is provided with a series of clevis holes 67, as usual, and for the usual purpose. Any suitable seat 68, may be provided for the driver of the tractor; that shown being mounted so as to bring the driver well to the rear of the tractor where he may more readily reach the levers of the plow or other implement being drawn, while at the same time he is within reach of the operating levers of the tractor.

From the foregoing description, it will be seen that I attain the several objects of the invention set forth at the beginning of the specification, and have provided an extremely simple and practical machine.

The operation of the machine will be entirely clear to those skilled in the tractor art and need not, therefore, be further detailed. It will, of course, be understood that the details of construction and arrangement may be considerably modified without departing from the invention, particularly as regards its broader aspects. The appended claims are therefore to be construed as broadly as their terms and the state of the art warrants.

I claim as my invention:

1. The combination of a rigid frame, transversely extending coaxial differential shafts mounted to rotate in one end of said frame, a power plant rigidly secured on the other end of said frame, differential gearing interposed between said power plant and said differential shafts for driving the latter, yokes located on opposite sides of said housing and independently pivoted on said frame intermediate their ends to oscillate on a transverse axis coaxial with the differential shaft axis, a supporting wheel mounted on each yoke end, means on the outer ends of said differential shafts for driving each pair of wheels on corresponding sides of the frame, and suspension means flexibly connecting the other end of said frame with the adjacent yoke ends.

2. In combination, a suitable main frame comprising an engine-base, a transmission mechanism frame and a pair of alined laterally extending yoke-supports, all rigid with each other, tractor-wheel yokes mounted upon said yoke-supports, tractor wheels mounted upon the yokes, a differential shaft mounted to extend transversely of the machine through the yoke supports, driving connections between the differential shaft and the tractor wheels, a motor upon said main frame, transmission mechanism operatively connecting said motor with the differential shaft, and carrying supports between the main frame and the corresponding end of each of said tractor-wheel yokes.

3. In combination, a combined power plant and main frame, comprising a motor frame, a motor associated therewith, a change-speed housing and change-speed mechanism therein, a differential gear housing and differential mechanism inclosed therein, hollow, laterally-projecting, alined yoke-supports rigidly connected with said differential gear housing, a differential shaft mounted to extend axially through said yoke-supports, tractor-wheel yokes journaled to oscillate upon said yoke-supports, tractor wheels mounted in said yoke, operative driving connections between the tractor wheels and opposite ends of the differential shaft, and carrying supports between the power-plant frame and corresponding yoke-arms at each side.

4. In a four-wheel drive four-wheel supported self-propelled vehicle, the combination of a rigid frame, one end of which comprises a differential housing, a power plant carried by the other end of said frame, yokes located on opposite sides of said frame and independently pivoted on said frame intermediate their ends to oscillate on a common transverse axis, a set of four driving and supporting wheels on the respective ends of said yokes, a pair of differential shafts in said housing coaxial with said axis and driven by said power plant, driving gearing connecting the two wheels on each side of the frame with the respective differential shafts, and spring suspension means for supporting the power plant end of said frame on the adjacent end of the yokes.

5. In a four-wheel drive four-wheel supported self-propelled vehicle, the combination of a rigid frame, one end of which comprises a differential housing, a power plant carried by the other end of said frame, yokes located on opposite sides of said frame and independently pivoted on said frame intermediate their ends to oscillate on a common transverse axis, a set of four driving and supporting wheels on the respective ends of said yokes, a pair of differential shafts in said housing coaxial with said axis and driven by said power plant, driving gearing connecting the two wheels on each side of the frame with the respective differential shafts, spring suspension means for supporting the power plant end of said frame on the adjacent end of the yokes, and means for positively controlling the differentiation in the speed of said differential shafts.

JOHN O. HEINZE.